(No Model.)
I. G. LUNDAY.
HAY RAKE.
No. 538,530. Patented Apr. 30, 1895.
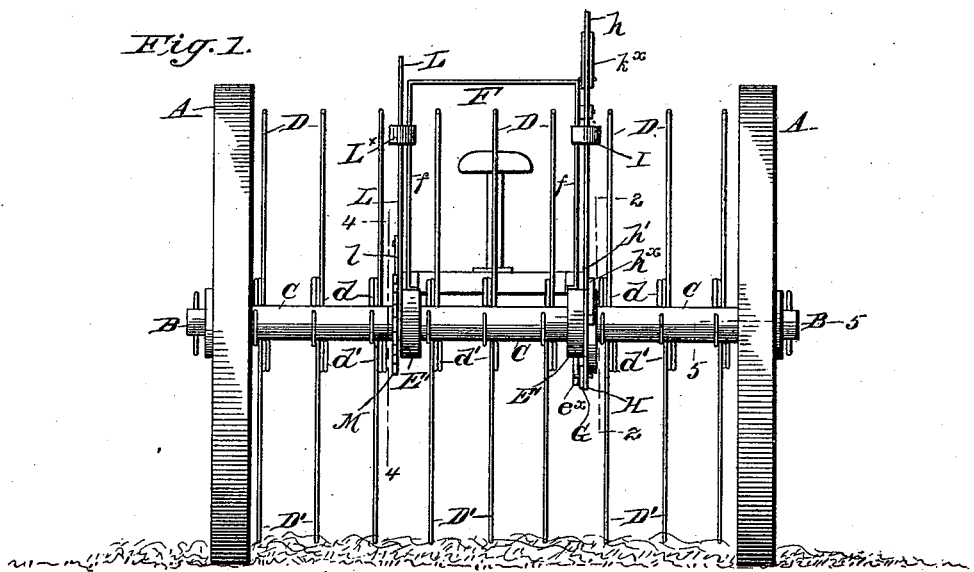
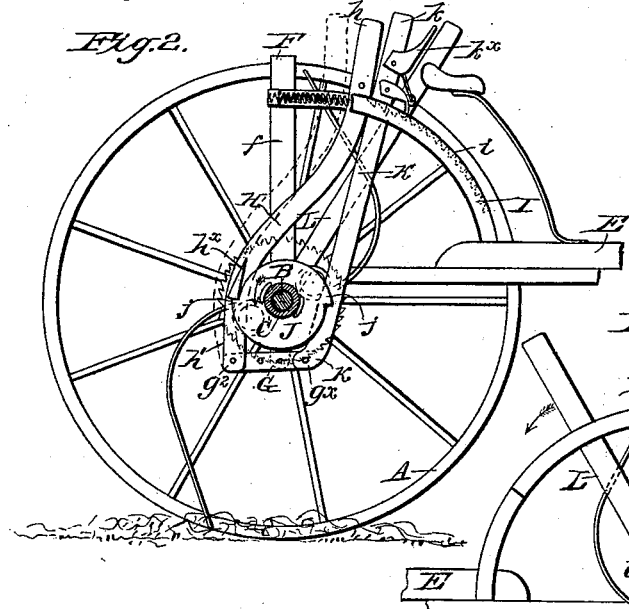
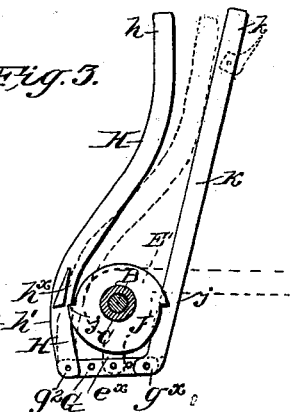
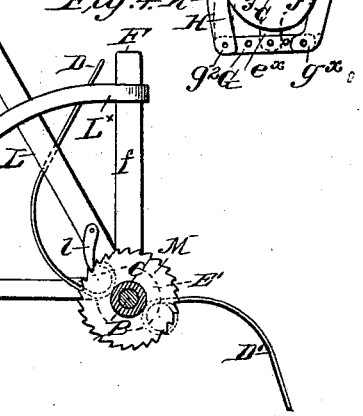
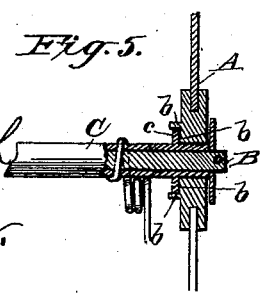
WITNESSES:
Fred G. Dieterich
H. J. Robinson
INVENTOR
Isaac G. Lunday
BY Munn & Co
ATTORNEYS.

UNITED STATES PATENT OFFICE.

ISAAC G. LUNDAY, OF HUBBARD, TEXAS.

HAY-RAKE.

SPECIFICATION forming part of Letters Patent No. 538,530, dated April 30, 1895.

Application filed October 29, 1894. Serial No. 527,215. (No model.)

*To all whom it may concern:*

Be it known that I, ISAAC G. LUNDAY, residing at Hubbard, in the county of Hill and State of Texas, have invented certain new and useful Improvements in Hay-Rakes, of which the following is a specification.

My invention relates particularly to improvements in revolving hay rakes, and it primarily has for its object, to provide a rake of this character, of a simple and economic construction, easily manipulated, and positive in its operation.

It has also for its object to provide a rake which is free to move backward without danger of injuring any of the parts, in which the rake head and teeth are arranged to turn freely, and which has a simple arrangement of lever mechanism, whereby the ground pressure of the teeth can be instantly regulated.

With other objects in view, which hereinafter will be referred to, the invention consists in such novel features of construction and peculiar combinations of parts, as will be hereinafter first described in detail and then be pointed out in the appended claims, reference being had to the accompanying drawings, in which—

Figure 1 is a rear elevation of my improved hay-rake. Fig. 2 is a longitudinal section of the same on the line 2 2, Fig. 1, the parts being in position for raking. Fig. 3 is a similar view showing the stop-lever moved to a released position to permit the rake-head to turn. Fig. 4 is a detail longitudinal section taken on the line 4 4, Fig. 1; and Fig. 5 is a detail section of a portion of the rake-head or axle and one of the wheel-hubs.

In the accompanying drawings A, A, indicate the drive or supporting wheels which are loosely journaled on an axle member B, on which is fitted a sleeve C, the ends of which have collars $c$—$c$ which fit in socket portions $b$ on the wheel hubs (see Fig. 5), such sleeve and axle member B forming as it were the rake head.

To the rake head is secured a double series of spring raking teeth D D′, which are arranged in the usual S shape, their shanks $d$ $d'$ passing through and being clamped to the axle B and sleeve C as shown.

E indicates the shafts which are secured to metal arms having eye portions E′ E′ fitted to revolve loosely on the sleeve C, from which project upward the side members $ff$, of a yoke F. One of the eye portions E′ has a pendent lug $e^\times$ (see Fig. 3) to which is pivotally and adjustably connected a plate G, to the rear end of which is pivotally joined the lower end of a lever H, which curves forward over the rake head and has its handle member $h$ fitted in a segmental guide I, secured to the yoke F, and the right hand shaft member, and such lever is normally held to its forward position by spring pressure as shown.

The rear portion $h'$ of the lever H has a stud or projecting member $h^\times$, which is normally held in engagement with one of a pair of diametrically oppositely disposed lugs $j$ integrally formed on a collar J, fixedly connected to the sleeve C, such lug and lever serving to hold the teeth down to the ground; and owing to the peculiar manner in which the lever is connected to the rake and with said collar, it is manifest that when the said lever H is drawn back against its spring, as in Fig. 3, the lug $h^\times$ will be drawn from engagement with the adjacent lug $j$, and thereby allow for a free revolution of the rake head, when during the operation of the machine the desired pile of hay has been gathered, and providing thereby a simple and effective means whereby the teeth will quickly lift and leave the load or pile in a nice condition and not scatter it.

To the front end of the plate G is pivotally joined the lower end of a front lever K, the handle portion $k$ of which also passes through the guide I in front of the lever H, and such lever K has a detent $k^\times$, which engages a rack portion $i$, on the said guide I.

It will be observed by reference to Fig. 2, that the rack $i$ is arranged eccentric to the pivotal connection of the lever K with the plate G, so that when the lever K is retracted, the bar or plate G will be drawn about its pivotal connection with the shaft member, so that the rake teeth will be drawn in contact with the ground.

As before stated the plate G is pivoted to one of the collars E′, and as the levers H and K are pivotally connected at their lower ends with the opposite ends of such plate G, it follows, that as the lever is moved upward in the guide I, the end $g^\times$ will be raised as the end $g^2$ is lowered, and in consequence causes a pressure on the collar J in the direction indicated by the arrow in Fig. 3, and thereby causes the rake head to bear down rearwardly and press the teeth down against the ground, the pressure being regulated by the adjustment of the lever K.

To facilitate the turning of the rake head in case it does not turn completely over when released in the manner before stated, I provide at the left side of the yoke frame F a lever L movable in a guide $L^{\times}$, which lever has a gravity pawl $l$, held in engagement with a toothed collar M, fixedly secured on the sleeve C, as most clearly shown in Fig. 4, from which it will be seen by working the said lever L forward in the direction indicated by the arrow, the pawl $l$ will engage the toothed collar and in consequence turn the rake head.

From the foregoing description taken in connection with the drawings it is thought the complete operation and the advantages of my invention will be readily apparent. The same is of a very few parts and owing to the manner in which the wheels are mounted on the axle they can revolve backward without the least danger of injury to the rake devices proper, and by arranging the several lever devices as shown they can be easily manipulated by the driver, such levers in practice being disposed near the driver's seat.

Having thus described my invention, what I claim as new, and desire to secure by Letters Patent, is—

1. As an improvement in hay rakes the combination with the rake head having a collar having detent or lug portions, of the shaft members loosely journaled on the said head, a plate G pivotally connected with the lower end of the shaft member, adjacent the rake head collar, a lever pivotally connected to the plate G, having a lug member adapted to be moved into engagement with the detent portions of the aforesaid collar, and a supplemental lever mechanism connected with the said plate G for adjusting the back pressure of the aforesaid lug member against the detent on the rake head collar, substantially as and for the purposes shown and described.

2. In a hay rake as described the combination with the wheels A A the rake head loosely journaled thereon, and the shafts having eye members loosely held on the rake head, one of such eye members having a pendent portion and the collar J fixedly held on the rake head having oppositely disposed lugs $j$ of the guide member I the plate G centrally pivoted on the aforesaid pendent portion the lever H pivoted to the rear end of the plate G and extended up over the rake head and having its handle portion held by the guide, said lever having a member adapted to normally engage either of the lugs $j$, and the lever K pivoted to the front end of the member G, and having its handle end provided with a lock pawl or detent adapted to engage the guide all arranged substantially as shown and for the purposes described.

ISAAC G. LUNDAY.

Witnesses:
M. B. ROBISON,
W. C. HUCHINGSON.